United States Patent [19]

Cymbal

[11] Patent Number: 4,970,910
[45] Date of Patent: Nov. 20, 1990

[54] STEERING COLUMN WITH TILT-ADJUSTABLE STEERING WHEEL

[75] Inventor: William D. Cymbal, Freeland, Mich.

[73] Assignee: General Motors Corporation, Detroit, Mich.

[21] Appl. No.: 434,204

[22] Filed: Nov. 13, 1989

[51] Int. Cl.⁵ .............................................. B62D 1/18
[52] U.S. Cl. ........................................ 74/493; 74/526; 74/541
[58] Field of Search ........................ 74/493, 526, 541; 280/775

[56] References Cited

U.S. PATENT DOCUMENTS

| | | | |
|---|---|---|---|
| 3,167,971 | 2/1965 | Zeigler et al. | 74/493 |
| 3,183,884 | 5/1965 | Daniels | 74/493 X |
| 3,258,987 | 7/1966 | Zeigler et al. | 74/493 |
| 3,473,405 | 10/1969 | Deford et al. | 74/493 |
| 3,518,895 | 7/1970 | Buechler et al. | 280/775 X |
| 4,470,322 | 9/1984 | Beauch | 74/493 |

Primary Examiner—Allan D. Herrmann
Assistant Examiner—David W. Laub
Attorney, Agent, or Firm—Saul Schwartz

[57] ABSTRACT

A collapsible, energy absorbing steering column having a tilt-adjustable steering wheel thereon includes a blocking member on the tilt-housing supporting the steering wheel which moves from a non-blocking position to a blocking position at the onset of energy absorbing collapse. In the blocking position, the blocking member prevents actuating movement of the tilt-adjust release lever so that the tilt-adjusted position of the steering wheel is captured throughout the energy absorbing event.

3 Claims, 2 Drawing Sheets

/ 1

STEERING COLUMN WITH TILT-ADJUSTABLE STEERING WHEEL

FIELD OF THE INVENTION

This invention relates to an energy absorbing automobile steering column on which is mounted a tilt-adjustable steering wheel.

BACKGROUND OF THE INVENTION

In typical energy absorbing steering columns having tilt-adjustable steering wheels, a tilt-housing on which the steering wheel is supported is pivotally connected to a support housing that is attached by screws to a tubular upper mast jacket of the steering column. The upper mast jacket is telescopically connected to a tubular lower mast jacket through an energy absorbing medium such as interference fit steel balls which absorb energy by cold working the mast jackets during relative telescopic collapse therebetween. The steering wheel is maintained in any one of a plurality of tilt-adjusted positions by one or more lock shoes pivotally supported on the tilt-housing engaging an anchor pin on the upper mast jacket. The lock shoes are moved between locked and unlocked positions by a manually pivotable release lever on the tilt-housing conveniently located between the steering wheel and the instrument panel. In an energy absorbing steering column according to this invention, the release lever is immobilized during an energy absorbing event to maintain the tilt-adjusted position of the steering wheel throughout the duration of the energy absorbing event.

SUMMARY OF THE INVENTION

This invention is a new and improved energy absorbing steering column having a tilt-adjustable steering wheel mounted thereon wherein maintenance of the tilt-adjusted position of the steering wheel is assured during an energy absorbing collapse event. In the steering column according to this invention, a negative acceleration responsive blocking member on the tilt-housing supporting the steering wheel has a normal, non-blocking position and a blocking position to which it moves during the energy absorbing event. In the blocking position, the blocking member is interposed between a portion of the release lever and a wall on the tilt-housing and arrests movement of the release lever before the latter actuates the lock shoes. In one preferred embodiment of the steering column according to this invention, the blocking member is a steel ball in a bore in the tilt-housing, the ball lodging by gravity in its non-blocking position at the bottom of the bore under normal vehicle operating conditions and automatically traversing the bore to its blocking position at negative accelerations characteristic of an energy absorbing event. In a second preferred embodiment, the blocking member is a pawl pivotally supported at one end on the tilt-housing. The level normally depends from its pivot but swings up to its blocking position at negative acceleration characteristic of an energy absorbing event.

DESCRIPTION OF PREFERRED EMBODIMENTS

Figure 1:
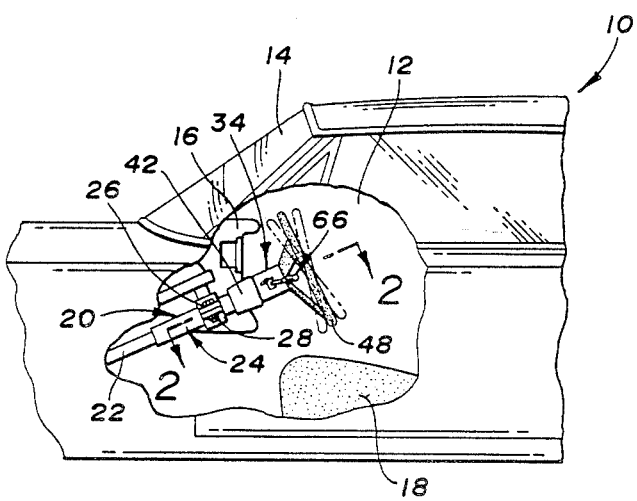
FIG. 1 is a fragmentary, partially broken-away side elevational view of an automobile having mounted thereon an energy absorbing steering column according to this invention.

Referring to FIG. 1 of the drawings, an automobile 10 has a passenger space 12 behind a front windshield 14. An instrument panel 16 of the vehicle is located at the front of the passenger space below the windshield and forward of a front seat 18. An energy absorbing steering column 20 according to this invention is disposed in the passenger space 12.

The steering column 20 includes a tubular lower mast jacket 22 and a tubular upper mast jacket 24, the lower end of which is telescoped over the upper end of the lower mast jacket. The lower end of the lower mast jacket is anchored on the vehicle and an energy absorbing medium, not shown, such as interference fitted steel balls is disposed in the annulus where the mast jackets overlap. The upper mast jacket is connected to the vehicle through a bracket 26 behind the instrument panel and a bracket 28 on the upper mast jacket which releases from the bracket 26 upon impact.

Figure 2:
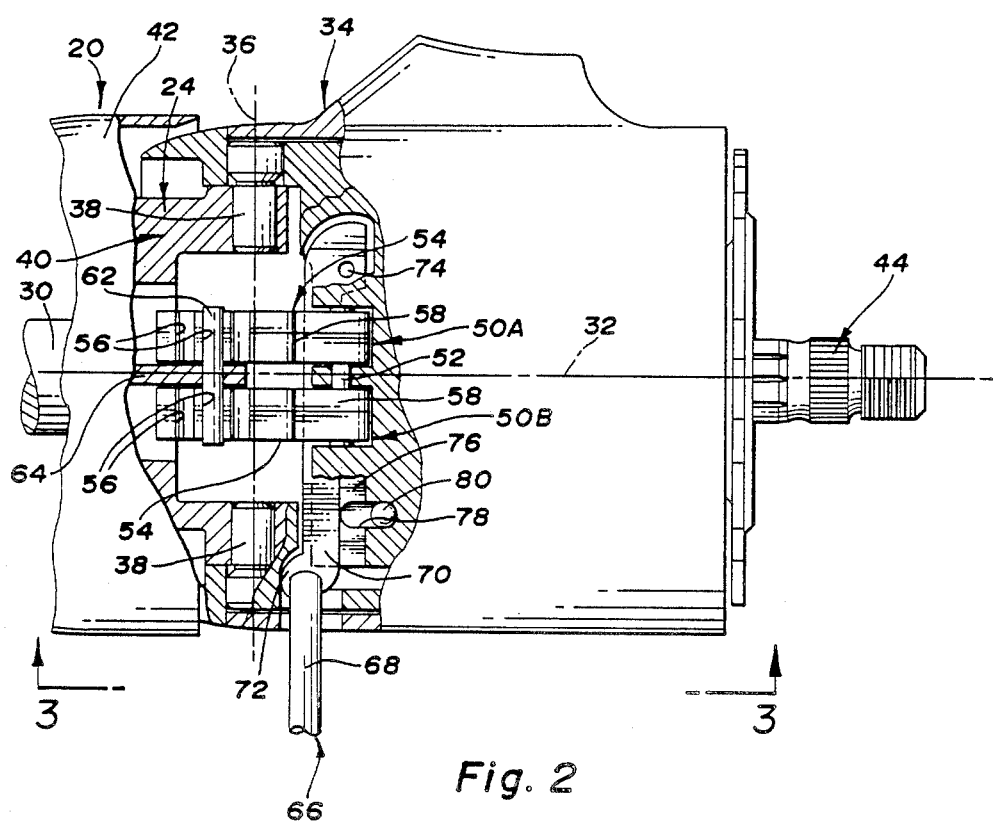
FIG. 2 is an enlarged partially broken-away view taken generally along the plane indicated by lines 2—2 in FIG. 1 and illustrating the energy absorbing steering column according to this invention without the steering wheel.
Figure 3:
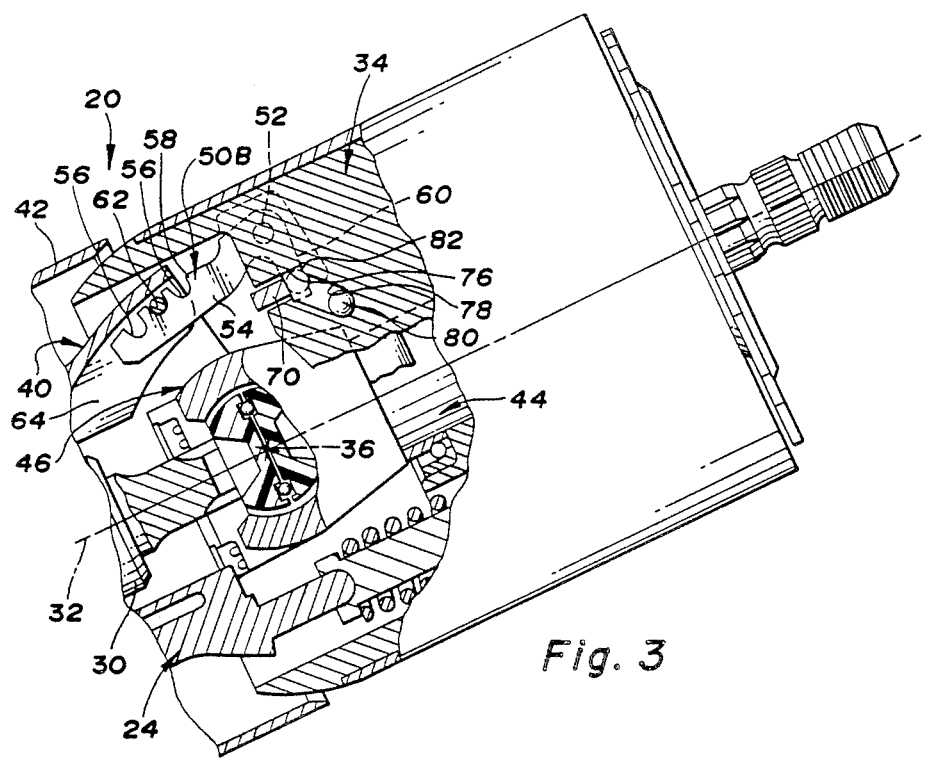
FIG. 3 is a partially broken-away view taken generally along the plant indicated by lines 3—3 in FIG. 2.

As seen best in FIGS. 1-3, a lower steering shaft 30 is supported in the upper and lower mast jackets for rotation about a longitudinal axis 32 of the steering column. A tilt-housing 34 is supported on the upper end of the upper mast jacket for pivotal movement about a transverse axis 36 by a pair of trunnions 38 on a bifurcated extension 40 of the upper mast jacket. A decorative bezel 42, FIG. 1, on the upper mast jacket 24 shrouds the interface between the upper mast jacket and the tilt-housing.

An upper steering shaft 4 is rotatably supported on the tilt-housing 34 and connected to the lower steering shaft 30 at a universal joint 46, FIG. 3. The upper steering shaft 44 projects beyond the end of the tilt-housing and is serrated to receive a steering wheel 48. The steering wheel and the upper and lower steering shafts rotate as a unit. A forward impact on the steering wheel 48 is transferred through the tilt-housing to the upper mast jacket to initiate collapse of the steering column. The lower steering shaft 30 includes a telescoping joint, not shown, and does not impede energy absorbing collapse of the steering column.

As seen best in FIGS. 2-3, a side-by-side pair of generally L-shaped lock shoes 50A-B is pivotally supported on a rigid pin 52 on the tilt-housing 34. Each shoe 50A-B has a long leg 54 with a plurality of notches 56 in an upper side 58 of the long leg and a short leg 60 extending radially inward toward the upper steering shaft 44. An anchor pin 62 is rigidly fitted in a tongue 64 on the bifurcated extension 40 of the upper mast jacket. A spring, not shown, biases the lock shoes 50A-B clockwise, FIG. 3, about the pin 52 so that the upper sides 58 of the long legs 54 are biased against the anchor pin 62.

The lock shoes 50A-B have a locked position, FIG. 2, characterized by seating of any of the notches 56 on the anchor pin 62 and an unlocked position, not shown, counterclockwise from the locked position and characterized by separation between the lock shoes and the anchor pin. In the unlocked position of the lock shoes, the tilt-housing 34, the upper steering shaft 44, and the steering wheel 48 are pivotable about the transverse axis 36 through a plurality of tilt-adjusted positions illustrated in broken lines in FIG. 1. In the locked position of the lock shoes, pivotal movement of the tilt-housing relative to the upper mask jacket is foreclosed and a selected one of the tilt-adjusted positions of the steering wheel is captured.

The lock shoes 50A-B are actuated from the locked to the unlocked position by a release lever 66 located between the steering wheel 48 and the instrument panel 16. The release lever includes a handle 68 and a flat pivot lever 70. The handle 68 is rigidly connected to the pivot lever 70 at a joint 72 and projects outside the tilt-housing 34. The pivot lever 70 is connected to the tilt-housing 34 at a pin 74, FIG. 2, for pivotal movement toward and away from the steering wheel 48. A spring, not shown, biases the release lever 66 away from the steering wheel toward the instrument panel to a retracted position, FIGS. 1-3.

In the retracted position of the release lever 66 and the locked position of the lock shoes 50A-B, the pivot lever 70 is disposed adjacent the short legs 60. When the driver pulls the handle 68 toward the steering wheel to an extended position of the release lever, not shown, the pivot lever 70 engages the short legs 60 of the lock shoes and pivots the shoes to the unlocked position wherein the driver can freely move the steering wheel through its tilt-adjusted positions. When the driver releases the handle 68, the spring returns the release lever to its retracted position and the tilt-adjusted position of the steering wheel is captured.

The tilt-housing 34 has a slot 76 in the plane of movement of the pivot lever 70 which the pivot lever traverses when the release lever is pulled from its retracted to its extended position. A cylindrical bore 78 in the tilt-housing intersects the slot 76 and extends inward therefrom toward the horizontal center-plane of the tilt-housing. A blocking member in the form of a steel ball 80 is loosely disposed in the bore 78 and is motivated by gravity to normally lodge in a non-blocking position, FIG. 3, at the blind or closed end of the bore inboard of the slot 76. In its non-blocking position, the ball 80 does not interfere with movement of the pivot lever 70 in the slot 76.

The ball 80 has a blocking position, shown in broken lines in FIG. 3, located generally at the intersection of the slot 76 and the bore 78. In its blocking position, the ball 80 is lodged between the pivot lever 70 and an end wall 82 of the slot 76, FIG. 3, and arrests movement of the pivot lever 70 before the lock shoes 50A-B achieve the unlocked position. Accordingly, when the ball 80 is in its blocking position, tilt-adjust movement of the tilt-housing 34 and the steering wheel 48 is foreclosed.

As long as the automobile is operated such that it experiences negative acceleration characteristic of usual controlled braking maneuvers, the ball 80 remains in its non-blocking position in the bore 78. The tilt-housing 34 and steering wheel 48 are moveable through their range of tilt-adjusted positions and the release lever 66 is fully operable.

In the event of high negative acceleration of the automobile 10 characteristic of a frontal impact and initiation of energy absorbing collapse of the steering column, the ball 80 virtually instantly shifts in the bore 78 to its blocking position. Since the high negative acceleration initiating movement of the ball continues throughout the duration of energy absorbing collapse of the steering column 20, the ball 80 stays in its extended position for the same duration. Accordingly, the tilt-adjusted position of the steering wheel 48 is maintained throughout collapse of the steering column regardless of possible engagement of the handle 68 of the release lever 66 on the instrument panel or other object.

Figure 4:
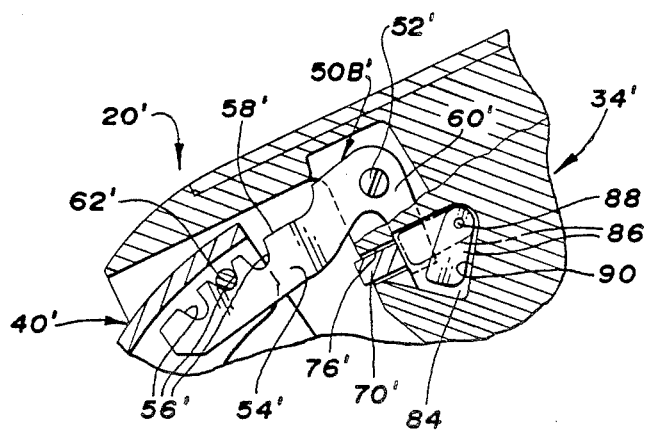
FIG. 4 is an enlarged view corresponding to a portion of FIG. 3 but illustrating a modified embodiment of the energy absorbing steering column according to this invention.

A modified steering column 20' according to this invention is illustrated in FIG. 4. Structural elements of modified steering column 20' having corresponding elements in steering column 20 are identified by primed reference characters. The tilt-housing 34' of the modified steering column 20' is relieved below the slot 76' to define a cavity 84. A blocking member in the form of a pawl 86 is pivotally supported at one end on a pin 88 in the cavity 84. The pawl 86 normally depends from the pin under the influence of gravity to a non-blocking position, FIG. 4, against a wall 90 of the cavity 84. The pawl is pivotable about the pin 88 from the non-blocking position to a blocking position, shown in broken lines in FIG. 4, in the plane of movement of the pivot lever 70'. In its blocking position, the pawl 86 acts like the ball 80 to arrest movement of the pivot lever before the latter achieves a position corresponding to the unlocked position of the lock shoes 50A'-B'.

As long as the automobile is operated such that it experiences negative acceleration characteristic of usual controlled braking maneuvers, the pawl 86 remains in its non-blocking position. Under high negative acceleration of the automobile characteristic of a frontal impact and initiation of energy absorbing collapse of the steering column, the pawl 86 virtually instantly swings clockwise, FIG. 4, from its non-blocking position to its blocking position. The pawl remains in its blocking position throughout the duration of energy absorbing collapse of the steering column and thereby prevents movement of the tilt-housing 34' and the steering wheel out of the tilt-adjusted position occupied at the onset of the energy absorbing collapse.

The embodiments of the invention in which an exclusive property or privilege is claimed are defined as follows:

1. In a collapsible, energy absorbing steering column for an automotive vehicle, said steering column having a first tubular mast jacket and a second tubular mast jacket telescopically overlapping said first tubular mast jacket and an energy absorber in said overlap between said first and said second tubular mast jackets operative during relative telescopic collapse therebetween, a tilt-housing connected to said second tubular mast jacket for pivotal movement about a transverse axis of said second tubular mast jacket, a lock shoe pivotally supported on said tilt-housing and resiliently biased to a locked position engaging a pin on said second tubular mast jacket to prevent relative movement between said second tubular mast jacket and said tilt-housing, and a manual release lever on said tilt-housing engageable on said lock shoe to move said lock shoe from said locked to an unlocked position during movement of said manual release lever from a retracted position to an extended position, the improvement comprising:

a blocking member, means on said tilt-housing defining an abutment, and
means mounting said blocking member on said tilt-housing for movement in response to negative acceleration of said vehicle characteristic of energy absorbing collapse of said steering column from a non-blocking position corresponding to normal operation of said steering column to a blocking position between said abutment and said manual release lever to prevent movement of said release lever to said extended position thereof during energy absorbing collapse of said steering column.

2. The steering column recited in claim 1 wherein said blocking member is a metal ball, and said means mounting said blocking member on said tilt-housing includes a cylindrical bore in said tilt-housing intersecting the path of motion of said release lever and having a closed end defining said non-blocking position of said blocking member.

3. The steering column recited in claim 1 wherein said blocking member is a pawl supported in a cavity in said tilt housing for pivotal movement between said non-blocking position wherein said pawl depends below the path of movement of said manual release lever to said blocking position wherein said pawl is disposed generally in the path of movement of said manual release lever.

* * * * *